(12) United States Patent
Cairns et al.

(10) Patent No.: US 8,798,176 B2
(45) Date of Patent: Aug. 5, 2014

(54) JOINT TIME/FREQUENCY PROCESSING FOR WIRELESS RECEIVERS

(75) Inventors: Douglas A. Cairns, Durham, NC (US); Andres Reial, Malmö (SE); Anders Wallén, Ystad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1011 days.

(21) Appl. No.: 12/500,891

(22) Filed: Jul. 10, 2009

(65) Prior Publication Data

US 2011/0007793 A1    Jan. 13, 2011

(51) Int. Cl.
H04K 1/10   (2006.01)
H04L 27/28   (2006.01)

(52) U.S. Cl.
USPC ......................................... 375/260

(58) Field of Classification Search
USPC ......... 375/141, 142, 147, 148, 229, 260, 296, 375/316, 332, 340, 341, 346, 350, 232
See application file for complete search history.

(56) References Cited

U.S. PATENT DOCUMENTS

| | | | |
|---|---|---|---|
| 6,307,884 B1* | 10/2001 | Du et al. ................. | 375/233 |
| 6,608,862 B1 | 8/2003 | Zangi et al. | |
| 6,826,226 B1 | 11/2004 | Sahlin et al. | |
| 6,839,378 B1* | 1/2005 | Sourour et al. .......... | 375/142 |
| 2005/0201447 A1 | 9/2005 | Cairns et al. | |
| 2006/0109897 A1* | 5/2006 | Guo et al. .............. | 375/232 |
| 2008/0095141 A1* | 4/2008 | Kong et al. ............. | 370/345 |
| 2008/0291887 A1 | 11/2008 | Cairns | |
| 2008/0304554 A1 | 12/2008 | Fulghum et al. | |

OTHER PUBLICATIONS

Monfet F. et al: "Turbo Equalization Using Frequency-Domain Shortening Filter for Broadband Single-Carrier Transmission Over Frequency-Selective Fading Channels", Vehicular Technology Conference, 2004. VTC 2004—Spring 2004 IEEE 59th Milan, Italy May 17-19, 2004, Piscataway, NJ, USA,IEEE,US, vol. 2, May 17, 2004, pp. 1059-1062, XP010766073, 001: 001:10.1109/VETECS.2004. 1388993 ISBN: 978-0-7803-8255-8 pp. 1059-1061, Sections II and III.

Zhang Y. et al., "Channel Shortened Chip-Level MMSE Equalization for CDMA Downlink", *Proceedings of Seventh International Symposium on Signal Processing and Its Applications*, vol. 2, pp. 331-334, 2003.

Song A. et al., "Generalized Equalization for Underwater Acoustic Communications", *Proceedings of Oceans 2005*, vol. 2, pp. 1522-1527, 2005.

* cited by examiner

*Primary Examiner* — Sam K Ahn
*Assistant Examiner* — Syed Haider (57) ABSTRACT

Channel estimation and/or equalization processing is performed in a wireless receiver in two stages. The first stage involves pre-filtering in the frequency domain to compact a grid-based representation of the net channel. The second stage involves implementing reduced-complexity time domain channel estimation and/or equalization. According to one embodiment, a received signal transmitted over a net channel is processed by pre-filtering the received signal in the frequency domain. The frequency domain pre-filtering compacts an N-tap effective grid-based representation of the net channel into a K-tap compacted grid-based representation of the net channel where K<N. The pre-filtered received signal is equalized in the time domain based on the K-tap compacted grid-based representation of the net channel generated by pre-filtering the received signal in the frequency domain.

18 Claims, 4 Drawing Sheets

JOINT TIME/FREQUENCY PROCESSING FOR WIRELESS RECEIVERS

TECHNICAL FIELD

The present invention generally relates to received signal processing by wireless receivers, and more particularly relates to received signal processing in the time and frequency domains by wireless receivers.

BACKGROUND

CDMA (Code Division Multiple Access) signals experience interference in dispersive channels. The interference is composed of self-interference (i.e. intersymbol interference), multiple access interference (i.e. interference due to non-zero code cross correlation), and other cell (i.e. downlink) or other user (i.e. uplink) interference. The interference affects two inter-related aspects of receiver performance. The first effect of interference is that some form of equalization is required in order to achieve good throughput for high data rate services. For example, to meet the enhanced throughput requirements set by 3GPP for type 2 (i.e. single antenna) and type 3 (i.e. dual antenna) receivers, a linear equalizer is needed. Second, channel estimates obtained via dedicated pilot symbols or a pilot channel are degraded. Lower-quality channel estimates affect the ability of the receiver to accurately equalize and/or estimate signal quality via SINR (signal to interference plus noise ratio). Various conventional approaches are available for addressing interference in the context of a CDMA signal. Each of these approaches account for interference during channel estimation and equalization.

There are typically two types of channel coefficients: medium and net. Medium channel coefficients refer to the complex values (magnitude and phase) associated with the radio channel. Net channel coefficients refer to the complex values associated with the composite channel response that includes the transmit filter, the medium channel coefficients, and the receive filter. Medium coefficients are denoted herein by the vector g which is an L×1 vector of complex values associated with L radio channel paths. Net channel coefficients are denoted herein by the vector h which is an M×1 vector of complex values (M≥L) associated with the M receiver fingers (i.e. path delays).

One conventional approach which accounts for interference during channel estimation and equalization is employed for WCDMA (Wideband CDMA) downlink signals which contain a strong pilot channel. This approach employs a relatively simple net channel estimator based on the symbols for the $n^{th}$ slot as given by:

$$\hat{h}(n) = \frac{1}{N_p} \sum_{k=0}^{N_p-1} x(n,k) s^*(n,k) \quad (1)$$

where x(n,k) is a vector of despread pilot symbols corresponding to receiver fingers for the $k^{th}$ symbol during the $n^{th}$ slot, s(n,k) is the $k^{th}$ symbol during the $n^{th}$ slot, and $N_p$ is the number of pilot symbols per slot. This simple net channel estimator can be extended to reduce noise via a relatively simple filtering operation given by:

$$\bar{h}(n) = \lambda \bar{h}(n-1) + (1-\lambda)\hat{h}(n) \quad (2)$$

However, there tends to be too few pilot symbols per slot available with this conventional technique for suppressing interference and noise appreciably. If the averaging indicated by equation (2) is used, noise and interference are suppressed somewhat, but the method is then essentially useful only for low speed scenarios. Generally, this method is incapable of producing truly high-quality channel estimates.

Another conventional approach is an MMSE (Minimum Mean Square Error) estimator which relies on a model for the channel and the relationship between medium and net channel coefficients. Medium channel coefficients can be converted to net coefficients as given by:

$$h = Bg \quad (3)$$

where B is an M×L conversion matrix and the (i,j) element of B is given by:

$$b_{i,j} = R_{TX/RX}(d_i - \tau_j). \quad (4)$$

Here, $R_{TX/RX}(\Delta)$ is the convolution of the transmit and receive filters evaluated at $\Delta$, $d_i$ is the delay of the $i^{th}$ receiver finger, and $\tau_j$ is the $j^{th}$ path delay. The conversion from net to medium coefficients is given by:

$$g = (B^H B)^{-1} B^H h \quad (5)$$

The MMSE channel estimator can be shown to be:

$$g_{MMSE} = R_g B^H (B R_g B^H + R_u)^{-1} \hat{h} \quad (6)$$

In equation (6), $R_g$ is a medium coefficient correlation matrix (i.e. $E\{gg^H\}$), $R_u$ is an impairment covariance matrix, and $\hat{h}$ is the net channel estimate given in equation (1). MMSE estimators tend to be highly dependent on accurate knowledge of the channel delays. When such information is available, MMSE estimators perform relatively well. However, even small errors in channel delay estimation significantly reduce the effectiveness of MMSE estimators.

Still another conventional approach is an ML (Maximum Likelihood) estimator which treats the channel coefficients as unknown deterministic parameters. The channel coefficients can be estimated directly by solving a problem of the form $\min_x \|Ax-b\|_2^2$. The solution to this problem can be obtained by the least squares method. To form a least squares solution, the following matrix and vector from the $N_p$ pilot symbol intervals in the current slot is provided:

$$A = \begin{bmatrix} Bs(n,0) \\ Bs(n,1) \\ \vdots \\ Bs(n, N_p - 1) \end{bmatrix} \quad (7)$$

$$b = \begin{bmatrix} x(n,0) \\ x(n,1) \\ \vdots \\ x(n, N_p - 1) \end{bmatrix}$$

A whitening transformation is then applied to A and b. The whitening transformation is typically the inverse of the Cholesky factor of the impairment covariance matrix $R_u$. The impairment covariance matrix is Cholesky factorized as given by:

$$GG^H = chol(R_u) \quad (8)$$

and the inverse of either the lower triangular or upper triangular factor computed. The inverse Cholesky factor is applied to A and b to give:

$$\tilde{A} = G^{-1} A$$

$$\tilde{b} = G^{-1} b \quad (9)$$

The transformed matrices can be used to compute relatively high quality medium channel estimates as given by:

$$g_{whiten}=(\tilde{A}^H\tilde{A})^{-1}\tilde{A}^H\tilde{b} \qquad (10)$$

and the corresponding net channel estimates from:

$$h_{whiten}=Bg_{whiten} \qquad (11)$$

Like MMSE estimators, ML estimators tend to be highly dependent on accurate knowledge of the channel delays, and thus also suffer from even small errors in channel delay estimation.

Other conventional approaches utilize linear equalization for suppressing interference in WCDMA receivers. Linear equalization is typically performed at either the chip level or symbol level. Symbol level equalization follows the traditional Rake architecture where received chip-level data is despread at multiple delays, and the multiple images combined. Chip level equalization reverses the order of these operations. That is, the received chip data is first combined using a linear filter and then despread at a single delay. Both approaches tend to be equivalent from a performance perspective.

The G-Rake receiver is representative of a conventional symbol-level equalization approach. G-Rake combining weights are used for coherent combining as well as interference suppression. The combining weights are given by:

$$w=R_u^{-1}h \qquad (12)$$

where $R_u$ is the impairment covariance matrix and h is a vector of net channel coefficients. G-Rake receivers can be implemented parametrically or non-parametrically. Nonparametric G-Rake methods are blind, and estimate $R_u$ directly from observed data. Parametric G-Rake methods assume an underlying model, and compute $R_u$ from model parameters.

With chip-level equalization, the received WCDMA signal at the chip level is given by:

$$r=Hc+v \qquad (13)$$

Here, r is a N+L−1 block of received chips, H is the (N+L−1)×N sized Toeplitz convolution matrix whose columns are time shifted versions of the channel impulse response h with delay spread L (chip or sub-chip spaced version of the net channel coefficients), v represents white Gaussian noise due to neighboring base stations and thermal noise, and c is the transmitted chip sequence. A chip equalizer filter f which suppresses interference is given by:

$$f=A^{-1}b \qquad (14)$$

where
  $A=E\{X^HX\}$
  $b=E\{X^HC_p^Hp\}$
  $X=C_p^HR$
  $C_p$=N×S sized pilot scrambling and spreading matrix
  p=pilot chip sequence It is generally assumed that there are S pilot symbols per data block and the columns of matrix R are time-shifted versions of the chip level received signal r.

WCDMA linear equalization can be thought of as applying a filter to undo the effect of the channel-induced interference. Some conventional approaches partition the filter into two or more sub-filters, an approach that can be thought of as split equalization. For example, a nonlinear equalizer may be required for certain applications such as EDGE (Enhanced Data rates for GSM Evolution) to meet particular performance targets. However, the complexity of a nonlinear equalizer is a function of the number of channel taps. Therefore, channel shortening (channel compacting) pre-filters have been designed to minimize the number of channel taps. Conventional pre-filters typically do not color the noise and interference, but simply concentrate the channel energy into a few taps. The pre-filter is followed by a DFSE (decision feedback sequence estimation) nonlinear equalizer. The combination of the pre-filter and DFSE equalizer performs the overall equalization task for an EDGE receiver.

Conventional split equalizers (pre-filter+DFSE) do not readily extend to WCDMA. It is typically assumed that the receiver has good information about the channel delays. For example, the receiver can hypothesize that there are either N or M symbol-spaced channel taps (N≠M). A pre-filter is then provided for each hypothesized number of channel taps, and the pre-filter that gives the best performance is utilized. However, a WCDMA receiver does not have such accurate knowledge of channel tap locations, thus making implementation difficult.

Linear equalizers for CDMA systems have generally been concentrated into one filter and implemented in the time domain. This limits the effective span of the equalizer and can inhibit the ability of the equalizer to handle dispersive scenarios. To obtain exact desired filter responses with time domain filtering, the required filter lengths often become impractically long, and thus impose a significant computational load. In practice, the filter response length is typically limited in the actual implementation. Doing so lowers the filtering accuracy and causes unwanted noise enhancement, as the first filtering stage causes uncontrolled frequency response variations in the signal passband.

SUMMARY

According to the methods and apparatus disclosed herein, channel estimation and/or equalization processing is performed in a wireless receiver in two stages. The first stage includes pre-filtering the received signal in the frequency domain. The pre-filtering operation involves compacting the net channel into a grid-based representation for subsequent processing. Pre-filtering in the frequency domain using the compacted grid-based representation of the net channel eliminates the need for precise channel delay information. In addition, pre-filtering in the frequency domain is relatively less complex compared to purely time domain processing of dispersive channels. The second stage of the signal processing techniques disclosed herein implements reduced-complexity time domain channel estimation and/or equalization. In one embodiment, the first stage is implemented as a chip-level pre-filter in the frequency domain and the second stage is implemented as a symbol-level channel estimator and/or equalizer in the time domain.

According to an embodiment of a method for processing a received signal transmitted over a net channel, the method includes pre-filtering the received signal in the frequency domain. The pre-filtering compacts an N-tap effective grid-based representation of the net channel into a K-tap compacted grid-based representation of the net channel where K<N. The pre-filtered received signal is equalized in the time domain based on the K-tap compacted grid-based representation of the net channel generated by pre-filtering the received signal in the frequency domain.

According to an embodiment of a wireless receiver, the receiver includes a first processing module and a second processing module. The first processing module is operable to generate an N-tap effective grid-based representation of a net channel over which a received signal is transmitted. The first processing module is also operable to pre-filter the received signal in the frequency domain to compact the N-tap effective grid-based representation of the net channel into a K-tap compacted grid-based representation of the net channel where K<N. The second processing module is operable to equalize the pre-filtered received signal in the time domain based on the K-tap compacted grid-based representation of the net channel generated by the first processing module.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
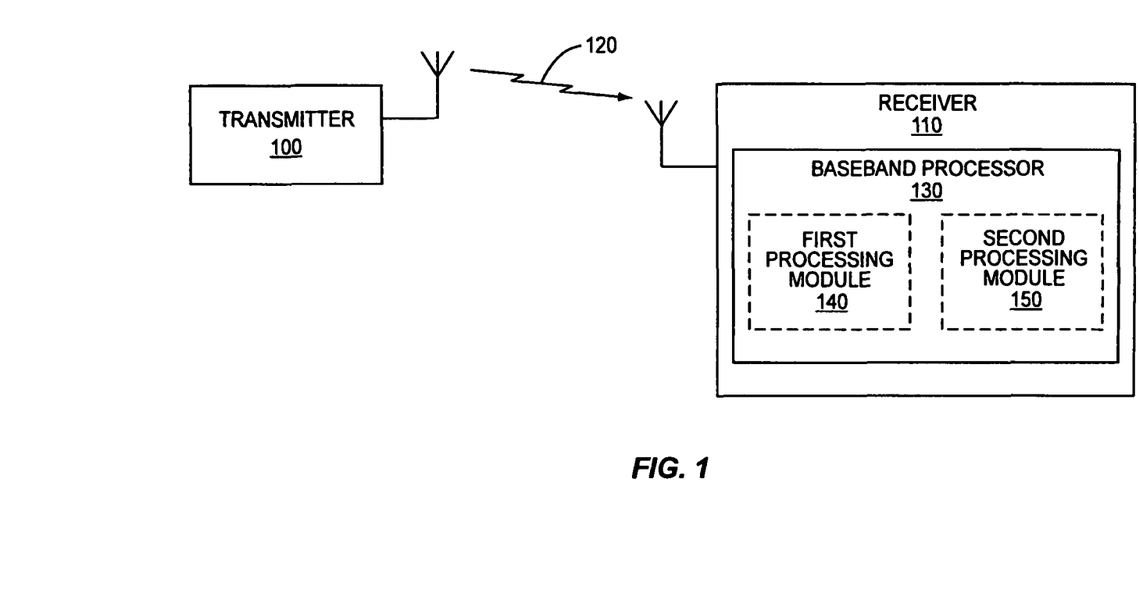
FIG. 1 illustrates a block diagram of an embodiment of a wireless communication system including a transmitter and a receiver.

FIG. 1 illustrates an embodiment of a communication system in which a transmitter 100 communicates with a receiver 110 over a wireless channel 120. For downlink transmissions, the transmitter 100 can be a base station such as a Node B and the receiver 110 can be a mobile wireless device serviced by the base station such as UE (user equipment). Conversely, the transmitter 100 can be a mobile wireless device and the receiver 110 a base station for uplink transmissions. In either case, the receiver 110 has a baseband processor 130 for processing a received signal. A first processing module 140 included in or associated with the baseband processor 130 implements chip level pre-filtering of the received signal in the frequency domain. A second processing module 150 included in or associated with the baseband processor 130 implements symbol level or chip level channel estimation and/or equalization in the time domain after pre-filtering of the received signal. The two-stage, multi-domain signal processing implemented by the first and second processing modules 140, 150 eliminates the need for precise channel delay information while utilizing reduced complexity time domain processing for channel estimation and/or equalization.

Figure 2:
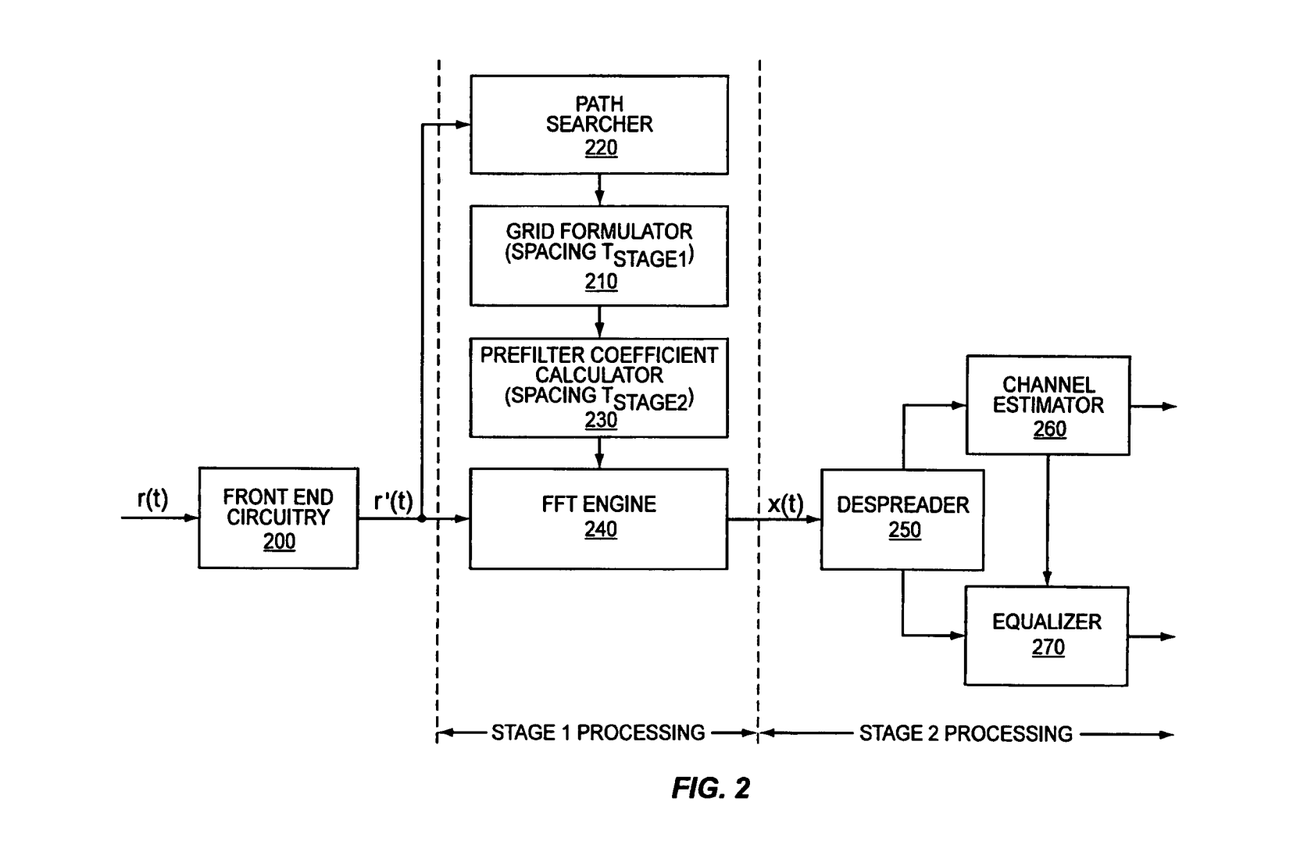
FIG. 2 illustrates a block diagram of an embodiment of signal processing modules included in the receiver of FIG. 1.

FIG. 2 illustrates an embodiment of the first and second processing modules 140, 150 which implement the two-stage, multi-domain signal processing. Front end circuitry 200 filters and down-converts the received signal r(t) into a chip-level received signal r'(t), the term 'chip' referring to the fundamental unit of transmission in CDMA. During the first processing stage, the chip-level received signal is pre-filtered in the frequency domain by the first processing module 140. To this end, the first processing module 140 generates a grid-based representation of the net channel which corresponds to the transmit filtering, radio channel 120 and receive filtering experienced by the transmitted signal. The first processing module 140 compacts the grid-based channel representation by concentrating the channel energy into the initial channel taps for use in pre-filtering the received signal in the frequency domain. The initial grid-based representation of the net channel has N taps (delays) spaced apart in accordance with a spacing interval $T_{stage1}$. The first processing module 140 includes a grid formulation component 210 for generating the grid-based representation of the net channel. The grid formulator 210 centers the grid based on coarse channel information provided by a path searcher component 220 of the first processing module 140.

Figure 3:
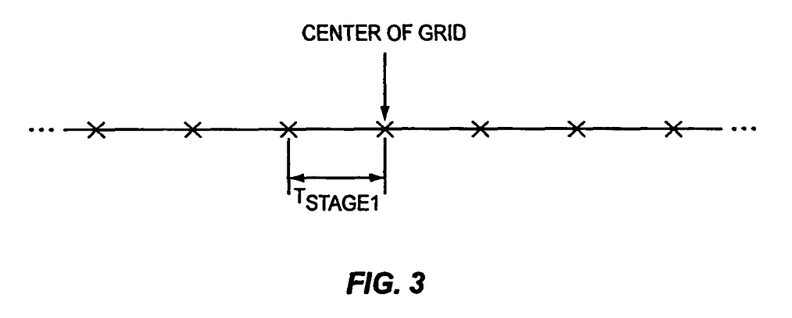
FIG. 3 illustrates an embodiment of a grid-based net channel representation compacted by the receiver of FIG. 1 for implementing frequency domain pre-filtering and subsequent time domain processing.

FIG. 3 illustrates an embodiment of the grid-based representation of the net channel generated by the grid formulator component 210 of the first processing module 140. Each grid point, denoted by the label 'X' in FIG. 3, represents a delay value. This grid-based channel representation is not generated based on precise channel delay information. That is, the grid points do not directly correspond to specific path delay values determined for the net channel. Instead, the grid is constructed based on coarse channel information provided by the path searcher 220. The grid formulator 210 uses the coarse channel information to center the grid. Once centered, adjacent grid points can be added which are spaced apart from one another in accordance with the spacing interval $T_{stage1}$, $T_{stage1}$ preferably being set near the Nyquist rate or less. Other grid spacing intervals can be used depending on the application. For example, $T_{stage1}$ can be set above the Nyquist rate if desired.

Figure 4:
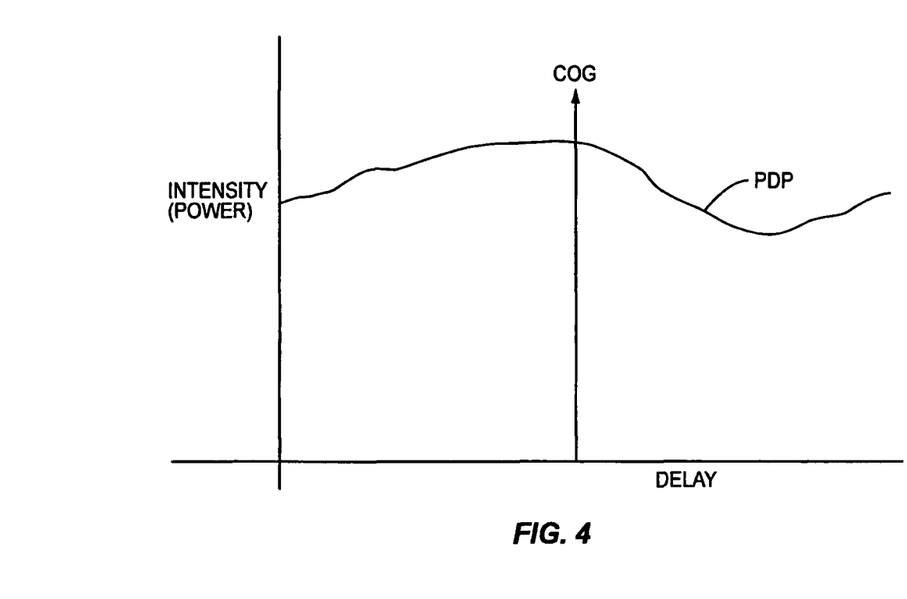
FIG. 4 illustrates an embodiment of a power delay profile for determining the COG of the net channel experienced by the receiver of FIG. 1.

In one embodiment, the coarse channel information provided by the path searcher 220 for centering the grid-based representation of the net channel represents an approximate center of gravity (COG) of the net channel. The path searcher 220 can determine the COG of the net channel based on a power delay profile (PDP) for the net channel as shown in FIG. 4. In another embodiment, the path searcher 220 identifies the strongest path delay associated with the net channel. Yet other techniques may be employed for centering the grid, e.g. as disclosed in U.S. patent application Ser. No. 12/408,939 filed on Mar. 23, 2009, the content of which is incorporated herein by reference in its entirety. In each case, the grid-based representation of the net channel is centered based on coarse channel information, not precise channel delay information. Accordingly, errors in the COG or path delays do not have a significant adverse affect on the performance of the two-stage received signal processing performed by the first and second processing modules 140, 150.

In one embodiment, the grid formulation component 210 of the first processing module 140 builds out the grid by adding grid points which are spaced apart based on a sub-chip spacing interval of $T_{stage1}=T_c/2$, where $T_c$ corresponds to the chip interval of the received signal. In another embodiment, the grid formulator 210 employs a sub-chip spacing interval of $T_{stage1}=3T_c/4$ for spacing the grid points. In each case, the first processing module 140 then compacts the N-tap effective grid-based representation of the net channel into a compacted grid-based net channel representation having K taps where K<N. Compacting the grid-based channel representation concentrates the channel energy into the leading channel taps, simplifying processing while maintaining a grid-based representation of the net channel.

In one embodiment, the grid is compacted by generating pre-filter coefficients based on the net channel representation generated by the grid formulator 210. To this end, the first processing module 140 includes a coefficient calculator 230 for calculating the pre-filter coefficients. The pre-filter coefficients are designed to compact the net channel representation such that the compacted representation corresponds to a second grid having K leading channel taps (delays) spaced apart by $T_{stage2}$, where $T_{stage2}$ can be less than, greater than or equal to $T_{stage1}$. The coefficient calculator 230 performs the pre-filter response calculations in the time domain or the frequency domain. Various design criteria can be accounted for when calculating the pre-filter coefficients, e.g. as disclosed in U.S. Pat. Nos. 6,608,862 and 6,826,226, the contents both of which are incorporated herein by reference in their entirety. The first processing module 140 then pre-filters the chip-level received signal r'(t) in the frequency domain using a frequency domain representation of the pre-filter coefficients.

The first processing module 140 includes an FFT (Fast Fourier Transform) engine 240 for implementing the frequency domain pre-filtering. In one embodiment, the receiver 110 is compatible with both WCDMA and LTE (Long Term Evolution), and thus makes use of the FFT engine already typically available for supporting LTE. The modulation/demodulation of an LTE signal is based on frequency domain processing, and thus the FFT engine of an LTE receiver can be reused to implement the frequency domain processing described herein, improving the performance and/or cost of the corresponding WCDMA receiver. Otherwise, the FFT engine 240 is added as a new component to the receiver 110. In either case, the FFT engine 240 pre-filters the received signal by multiplying a frequency domain representation of the pre-filter coefficients and a frequency domain representation of the received signal.

Following the first stage, the net channel energy is concentrated into K taps having known locations spaced apart by $T_{stage2}$. With this information, the second processing module 150 can equalize the received signal in the time domain. The second processing module 150 can also perform channel estimation during the second stage so that an estimate of the amplitude and phase shift caused by the wireless channel 120 is available. In one embodiment, the received signal is despread by a despreader component 250 of the second processing module 150. The despread samples are used by a channel estimation component 260 of the second processing module 150 to generate medium channel estimates such as MMSE estimates as disclosed in U.S. patent application Ser. No. 11/935,604, filed on Nov. 6, 2007 or ML estimates as disclosed in U.S. patent application Ser. No. 12/027,492, filed on Feb. 7, 2008, the contents both of which are incorporated herein by reference in their entirety.

The second processing module 150 also includes an equalizer component 270 for performing equalization at either the chip level or symbol level so that the interference due of the wireless channel 120 can be mitigated, allowing subsequent symbol demodulation. Equalization is performed with significantly reduced complexity since the net channel has been compacted as previously described herein. Equalization complexity is reduced because of the simple finger/tap (delay) placement made possible by the grid nature of the effective channel and because fewer fingers/taps (delays) are needed because the channel is relatively compact. Using a compacted grid-based representation of the net channel enables the use of nonlinear equalization because the state space needed to implement a nonlinear equalizer reduces to a realistic size for nonlinear equalization techniques such as an MLSE (Maximum Likelihood Sequence Estimation).

Described next is an embodiment of a method for processing a signal received by the receiver 110 of FIG. 1. According to this embodiment, steps are described for realizing a combination of linear symbol level equalization and ML channel estimation. The path searcher component 220 of the first processing module 140 performs a path search. The grid formulation component 210 of the first processing module 140 constructs a contiguous grid of pre-filter taps (delays) centered on the COG or strongest reported path delay associated with the net channel. The grid points have a spacing interval of $T_{stage1}$ corresponding to N taps (delays). In some embodiments, the grid can be adaptively constructed responsive to the channel RMS (Root Mean Square) delay spread, e.g. as described in U.S. patent application Ser. No. 12/408,939.

The method continues with the coefficient calculator component 230 of the first processing module 140 computing pre-filter tap coefficients p(t) based on the grid-based channel model generated by the grid formulator 210, e.g. based on the approach described in U.S. Pat. No. 6,826,226. The received signal is then pre-filtered by the FFT engine 240. The pre-filtering operation is realized in the frequency domain by transforming the chip-level received signal r'(t) to the frequency domain as given by:

$$r'(t) \rightarrow R(\omega) \qquad (15)$$

The pre-filter tap coefficients p(t) are also transformed to the frequency domain as given by:

$$p(t) \rightarrow P(\omega) \qquad (16)$$

The FFT engine 240 multiplies the transformed signals as given by:

$$X(\omega) = R(\omega)P(\omega) \qquad (17)$$

The FFT engine 240 applies appropriate zero padding so that (17) describes the frequency domain version of linear convolution, e.g. in accordance with the 'overlap-add' or 'overlap-save' approaches described in A. Oppenheim, R. Schafer, Discrete-Time Signal Processing, Prentice-Hall, Englewood Cliffs N.J., copyright 1989, the related content of which is incorporated herein by reference. The FFT engine 240 then transforms the pre-filtered signal back to the time domain by applying an IFFT (Inverse FFT) to X(ω) as given by:

$$X(\omega) \rightarrow x(t) \qquad (18)$$

The pre-filtered time domain received signal x(t) is then despread by the despreader component 250 of the second processing module 150. The channel estimator component 160 of the second processing module 150 performs medium channel estimation using the despread information, e.g. in accordance with the ML approach described in U.S. patent application Ser. No. 12/027,492 given the K effective compacted channel taps with grid spacing $T_{stage2} = T_{stage1}$.

In addition or alternatively, the pre-filtered received signal x(t) output by the FFT engine 240 can processed by the equalizer component 270 of the second processing module 150. The equalizer 270 can perform symbol-level parametric equalization using a grid of fingers (delays) centered on the COG or strongest path delay of the new effective channel (i.e., post pre-filtering), e.g. in accordance with US Patent Application 2005/0201447, filed Sep. 15, 2005, the content of which is incorporated herein by reference in its entirety. Alternatively, the equalizer 270 can perform non-parametric symbol-level equalization using the centered grid of fingers (delays), e.g. in accordance with US Patent Application 2008/0304554, filed Dec. 11, 2008, the content of which is incorporated herein by reference in its entirety. The number of grid fingers (delays) can be optimized, e.g. offline to give very good performance for a known K-tap compacted net channel.

The receiver structure disclosed herein combines frequency domain and time domain processing. The frequency-domain pre-filtering described herein allows the exact desired first stage response to be applied without introducing noise enhancement due to filter truncation. In addition, performing frequency domain pre-filtering via FFT processing is computationally efficient. Use of the grid-based pre-filtering for WCDMA signals eliminates the need to hypothesize all expected wideband channels. Furthermore, grid-based pre-filtering of WCDMA signals is less sensitive to path searcher inaccuracies. Even small path searcher inaccuracies can have significant impact on conventional model-based channel estimation/equalization algorithms. The receiver structure described herein also enables efficient implementation of MMSE and ML channel estimation. Highly dispersive channels can also be efficiently equalized. Also, the receiver structure disclosed herein reduces the complexity of nonlinear equalization and is readily extendible to other wireless communication technologies such as TDMA (Time Division Multiple Access).

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method, in a code-division multiple access (CDMA) receiver, of processing a received signal transmitted over a net channel, comprising:
    centering an N-tap effective grid-based representation of the net channel, based on coarse channel information, wherein the grid-based representation is based on a sub-chip spacing interval;
    generating pre-filter coefficients based on the centered N-type effective grid-based representation of the net channel, wherein said pre-filter coefficients are designed to compact the centered N-tap effective grid-based representation of the net channel into a K-tap compacted grid-based representation of the net channel, where K<N;
    pre-filtering the received signal in the frequency domain, using a frequency-domain representation of the pre-filter coefficients; and
    equalizing the pre-filtered received signal in the time domain, based on the K-tap compacted grid-based representation of the net channel.

2. The method of claim 1, wherein said centering the N-tap effective grid-based representation of the net channel comprises centering the N-tap effective grid-based representation of the net channel about an approximate center of gravity determined for the net channel.

3. The method of claim 1, wherein said centering the N-tap effective grid-based representation of the net channel comprises centering the N-tap effective grid-based representation of the net channel about a strongest path delay determined for the net channel.

4. The method of claim 1, comprising spacing the N taps of the effective grid-based representation of the net channel at intervals of approximately Tc/2 where Tc corresponds to a chip interval of the received signal.

5. The method of claim 1, comprising spacing the N taps of the effective grid-based representation of the net channel at intervals of approximately 3Tc/4 where Tc corresponds to a chip interval of the received signal.

6. The method of claim 1, wherein said pre-filtering comprises multiplying the transformed pre-filter coefficients and a frequency domain representation of the received signal.

7. The method of claim 1, comprising equalizing the pre-filtered received signal in the time domain using a grid of path delays centered about a strongest path delay or an approximate center of gravity determined for the K-tap compacted grid-based representation of the net channel.

8. The method of claim 1, comprising estimating a medium channel response associated with the net channel based on the K-tap compacted grid-based representation of the net channel.

9. A code-division multiple-access (CDMA) wireless receiver, comprising:
    a first processing module operable to generate an N-tap effective grid-based representation of a net channel over which a received signal is transmitted, wherein the grid-based representation is based on a sub-chip spacing interval, to generate pre-filter coefficients based on the centered N-type effective grid-based representation of the net channel, wherein said pre-filter coefficients are designed to compact the N-tap effective grid-based representation of the net channel into a K-tap compacted grid-based representation of the net channel, where K<N, and to pre-filter the received signal in the frequency domain, using a frequency-domain representation of the pre-filter coefficients, said first processing module comprising a grid formulation component operable to center the N-tap effective grid-based representation of the net channel, based on coarse channel information; and
    a second processing module operable to equalize the pre-filtered received signal in the time domain, based on the K-tap compacted grid-based representation of the net channel generated by the first processing module.

10. The wireless receiver of claim 9, wherein the first processing module comprises a path searcher operable to determine an approximate center of gravity of the net channel and wherein said grid formulation component is operable to center the N-tap effective grid-based representation of the net channel about the approximate center of gravity.

11. The wireless receiver of claim 9, wherein the first processing module comprises a path searcher operable to determine a strongest path delay for the net channel and wherein said grid formulation component is operable to center the N-tap effective grid-based representation of the net channel about the strongest path delay.

12. The wireless receiver of claim 9, wherein the first processing module is operable to space the N taps of the effective grid-based representation of the net channel at intervals of approximately Tc/2 where Tc corresponds to a chip interval of the received signal.

13. The wireless receiver of claim 9, wherein the first processing module is operable to space the N taps of the effective grid-based representation of the net channel at intervals of approximately 3Tc/4 where Tc corresponds to a chip interval of the received signal.

14. The wireless receiver of claim 9, wherein the first processing module comprises a coefficient calculator operable to calculate the pre-filter coefficients based on the N-tap effective grid-based representation of the net channel.

15. The wireless receiver of claim 14, wherein the first processing module comprises an FFT engine operable to transform the pre-filter coefficients to the frequency domain.

16. The wireless receiver of claim 15, wherein the FFT engine is operable to pre-filter the received signal in the frequency domain by multiplying the transformed pre-filter coefficients and a frequency domain representation of the received signal.

17. The wireless receiver of claim 9, wherein the second processing module is operable to equalize the pre-filtered received signal in the time domain using a grid of path delays centered about a strongest path delay or an approximate center of gravity determined for the K-tap compacted grid-based representation of the net channel.

18. The wireless receiver of claim 9, wherein the second processing module is operable to estimate a medium channel response associated with the net channel based on the K-tap compacted grid-based representation of the net channel.

* * * * *